United States Patent [19]

Hyodo

[11] Patent Number: 4,703,669
[45] Date of Patent: Nov. 3, 1987

[54] SUPPORT STRUCTURE OF STEERING COLUMN TUBE

[75] Inventor: Youichi Hyodo, Toyota, Japan

[73] Assignee: Toyota Jidosha Kabushiki Kaisha, Toyota, Japan

[21] Appl. No.: 834,337

[22] PCT Filed: Aug. 26, 1985

[86] PCT No.: PCT/JP85/00470
§ 371 Date: Feb. 24, 1986
§ 102(e) Date: Feb. 24, 1986

[87] PCT Pub. No.: WO86/01477
PCT Pub. Date: Mar. 13, 1986

[30] Foreign Application Priority Data

Aug. 27, 1984 [JP] Japan ................................ 59-177759
Mar. 19, 1985 [JP] Japan ................................ 60-055436

[51] Int. Cl.⁴ ............................................. B62D 1/18
[52] U.S. Cl. ..................................... 74/492; 188/371; 248/548; 280/779; 411/371
[58] Field of Search ......................... 74/492; 188/371; 280/777, 779, 780; 248/548; 411/371, 372, 373

[56] References Cited

U.S. PATENT DOCUMENTS

| 1,611,302 | 12/1926 | Bourgon | 280/779 |
| 2,857,597 | 10/1958 | Morgan, Jr. | 411/373 X |
| 3,505,897 | 4/1970 | Scheffler et al. | 74/492 |
| 3,508,650 | 4/1970 | Carr | 411/373 X |
| 3,578,782 | 5/1971 | Miyoshi | 280/777 X |
| 3,803,938 | 4/1974 | Bratke et al. | 74/492 |

FOREIGN PATENT DOCUMENTS

| 50-81532 | 7/1975 | Japan . |
| 58-150552 | 8/1983 | Japan . |
| 59-1668 | 1/1984 | Japan . |
| 59-56164 | 4/1984 | Japan . |
| 59-57269 | 4/1984 | Japan . |
| 59-100662 | 7/1984 | Japan . |

Primary Examiner—Allan D. Herrmann
Attorney, Agent, or Firm—Oblon, Fisher, Spivak, McClelland & Maier

[57] ABSTRACT

Disclosed herein is a support structure of a steering column tube (10) for a vehicle which supports the steering column tube (10) through a column support bracket (12) to a support member (14) such as a vehicular body in such a manner as to absorb a large external force and avoid receipt of local stress for the purpose of ensuring safety of a driver. The column support bracket (12) is formed with a first bent portion (130) and a second bent portion (132) at upper and lower positions of the steering column tube (10) and/or with protectors (40).

11 Claims, 11 Drawing Figures

SUPPORT STRUCTURE OF STEERING COLUMN TUBE

TECHNICAL FIELD

The present invention relates to a support structure of a steering column tube in a vehicle such as an automobile, and more particularly to an improvement in the structure, shape and mounting portion of a support bracket of the steering column tube (which will be simply referred to as a column support bracket) to be used for supporting the steering column tube to a support member such as a vehicular body.

BACKGROUND ART

A known support structure of the steering column tube in a vehicle such as the automobile is such that the steering column tube is retained by the column support bracket, and the column support bracket is mounted to the support member such as the vehicular body by bolts. It is known in the art that the column support bracket is made of such a material and shape as permitting plastical deformation so as to absorb an impact energy applied through a steering wheel to the steering column tube. Such a technical idea is disclosed in Japanese Utility Model Laid-open No. 59-1668.

In a conventional support structure of an energy absorbing type steering column tube, a retainer portion of the column support bracket for inserting the steering colunn tube into a retainer hold and fixedly mounting same thereto is integrally connected through a bent portion to a support portion provided on a lower side of the steering column tube. When an external force is axially applied through the steering wheel to the steering column tube, the bent portion is plastically deformed to absorb the impact energy.

However, in the above-mentioned support structure, since the bent portion is provided at only one position on the lower side of the steering column tube, that is, at a single side position of the steering column tube, satisfactory plastical deformation may not be obtained against the external forces applied to the steering column tube in various directions, and accordingly energy absorbing action may not be sufficiently effected.

The external force is sometimes applied to the steering column tube in such a direction at a predetermined angle with respect to an axis of the steering column tube. Especially, when the external force is applied from the direction where the bent portion of the column support bracket is located, that is, the external force is applied from the lower side of the steering column tube, the bent portion is satisfactorily plastically deformed to effect the energy absorbing action. When the external force is applied to the steering column tube from the same direction as the axis of the steering column tube, the bent portion is satisfactorily plastically deformed in the same manner to effect the energy absorbing action. However, when the external force is applied from the direction where the bent portion is not located, that is, the external force is applied from the upper side of the steering column tube, a compression load is applied to the bent portion to render the plastic deformation of the bent portion unsatisfactory, which results in insufficient energy absorbing action.

Further, since the bent portion for absorbing the impact energy is provided on the lower side of the steering column tube, the support portion of the column support bracket is required to be shaped such that is surrounds the steering column tube. As a result, the shape of the bent portion is rendered complicated, and manufacture of the same is also difficult.

Further, the bolts to be mounted to the column support bracket are located on both sides to the steering column tube at a position opposed to a driver's knee, and the bolts are projected from the column support bracket. As a result, when the driver moves his foot in operation of a pedal, the knee abuts against the projected bolts to generate to the driver an uncomfortable feeling.

To solve this problem, various measures have been proposed, and one of such measures is that the bolts are mounted at a position not opposed to the position of the driver's knee. However, according to this measure, a supporting method of the steering column tube must be changed, and arrangement of parts in a small space inside of an instrument panel which is usually a support member of the steering column tube must be also changed. As a result, change in designing or productive technique must be accompanied.

To cope with this problem, a protector for covering a projecting portion of the bolt is provided without changing the mounting position of the bolt, so that the knee may not directly abut against the bolt. However, as the protector is formed independently of the column support bracket, the number of parts is increased, and a specific structure for mounting the protector is needed so as to thereby render the same complicated and in design having an increased cost. In a particular case where the protector is mounted by a bolt, the bolt is required to be located at a position not opposed to the position of the knee.

Accordingly, it is an object of the present invention to provide a column support bracket of a simple shape which may effect sufficient energy absorbing action with respect to various dimensional external forces applied to the steering column tube.

It is another object of the present invention to eliminate a problem in mounting of a protector for covering a bolt if the protector is used.

DISCLOSURE OF THE INVENTION

In one aspect of the present invention, bent portions for absorbing an impact energy are provided on upper and lower sides of the steering column tube. According to the support structure of the present invention, a steering column tube provided with a steering wheel at one end thereof is supported on a support member by a column support bracket which is made of plastically deformable materials. The column support bracket comprises a substantially planar mount portion to be fixed to the support member, a retainer portion having a retainer hole through which the steering column tube is inserted, and a support portion for fixedly mounting the steering column tube. The retainer portion is formed with a first bent portion integrally extending from the mount portion toward the steering wheel. The support portion is formed with a second bent portion integrally extending from an end portion of the retainer portion toward the steering wheel. The steering column tube is fixed by welding for example. Thus, when an external force is axially applied to the steering column tube, the first and second bent portions are plastically deformed to absorb the impact energy.

In the case where the support member of the steering column tube on the vehicular body side is provided on the upper side of the steering column tube in a normal manner, the first bent portion is located on the upper side of the steering column tube, and the second bent portion is located on the lower side of the steering column tube.

As is mentioned above, the bent portions for absorbing the impact energy are located on the upper and lower sides of the steering column tube. Accordingly, the first and second bent portions are plastically deformed in cooperation to effect energy absorbing action against various dimensional external forces as applied at various angles with respect to the axis of the steering column tube. That is to say, the first bent portion is plastically deformed even against the external force from the direction where the first bent portion is located and plastical deformation is conventionally difficult, and owing to the plastical deformation of the first bent portion, the second bent portion is also plastically deformed smoothly thereby to effect sufficient energy absorbing action.

In another aspect of the present invention, the protector is not required to be independently mounted by a bolt for example. That is to say, the protector is integrally formed with the column support bracket, and is located between a bolt mount position and a knee position. Further, the protector is bent to effect plastical deformation.

As is mentioned above, since the protector is provided between the bolt mount position and the knee position, the knee is prevented from directly abutting against the bolt.

Further, since the protector is integrally formed with the column support bracket, it may be mounted together with the column support bracket. In other words, the protector is not required to be independently mounted.

Further, since the protector is bent to effect plastical deformation, it is deformed upon application of an external force by the knee or the like thereby to absorb the impact energy of the external force.

BRIEF EXPLANATION OF THE DRAWINGS

FIGS. 1 to 5 show a first preferred embodiment of a support structure of an energy absorbing steering column tube according to the present invention, in which FIG. 1 is a side view of a column support bracket; FIG. 2 is an elevational view of the column support bracket; FIG. 3 is a perspective view of the column support bracket; FIG. 4 is a side view of the column support bracket under a plastically deformed condition; and FIG. 5 is an illustration showing the arrangement of the steering column tube.

FIGS. 6 to 11 show a second preferred embodiment of the support structure of the energy absorbing steering column tube according to the present invention, in which FIG. 6 is a side view of the column support bracket; FIG.7 is a perspective view of the column support bracket; FIG. 8 is an elevational view of the column support bracket; FIG. 9 is an illustration showing installation of a bolt; and FIG. 10 is an illustration showing the arrangement of the steering column tube.

FIG. 11 is a perspective view of the column support bracket in a third preferred embodiment of the support structure of the steering column tube according to the present invention.

THE BEST MODE FOR EMBODYING THE INVENTION (First Preferred Embodiment)

FIGS. 1 to 5 show a first preferred embodiment of a support structure of an energy absorbing steering column tube according to the present invention.

Figure 5:
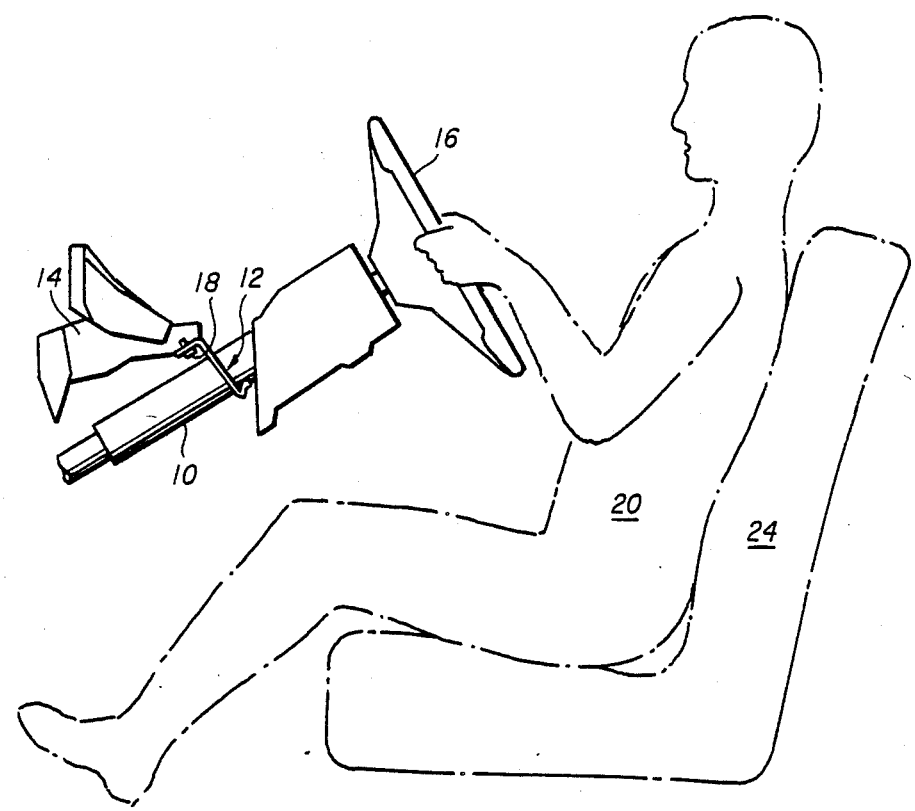

Referring to FIG. 5 which shows an illustation of the steering column tube, reference numerals 10, 12, 14 and 16 designate a steering column tube, a column support bracket, a support member on a vehicular body side such as an instrument panel and a steering wheel, respectively. The steering column tube 10 is supported through the column support bracket 12 to the support member 14. The steering wheel 16 is located at an upper end of the steering column tube 10 (at a right end thereof as viewed in FIG. 5). Reference numerals 20 and 24 designate a driver and a seat.

Figure 1:
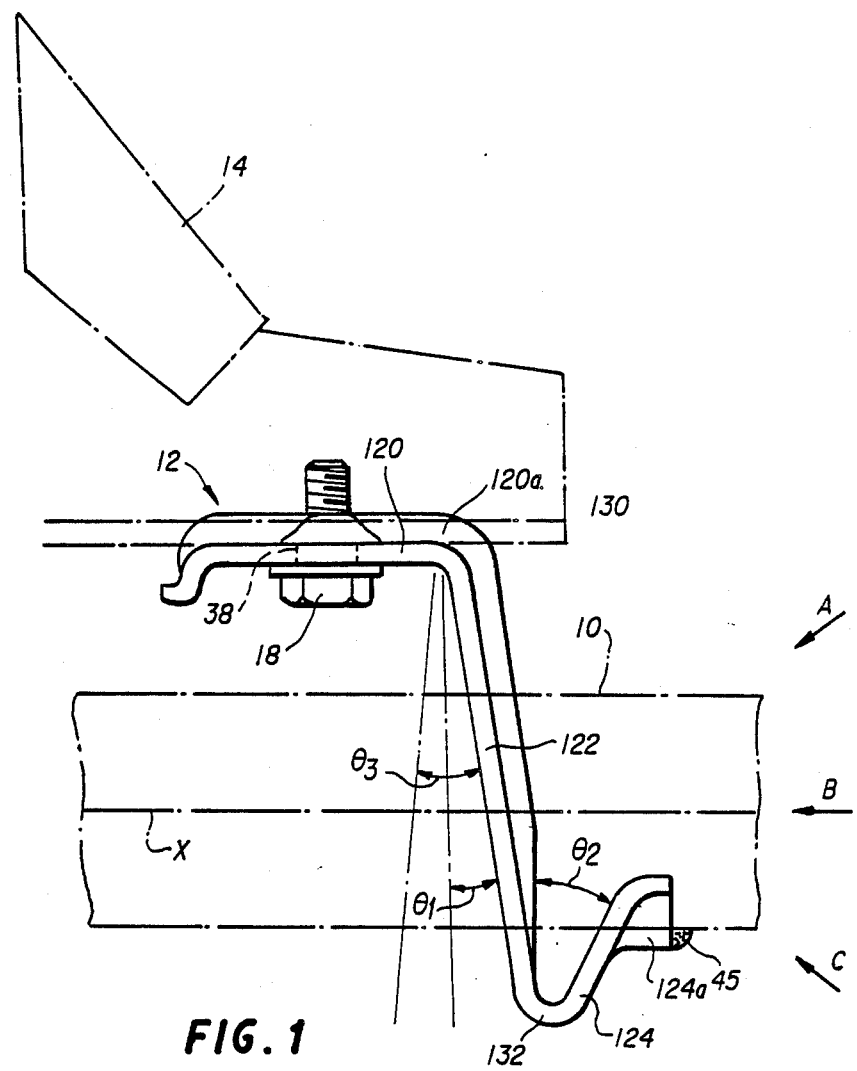
Figure 2:
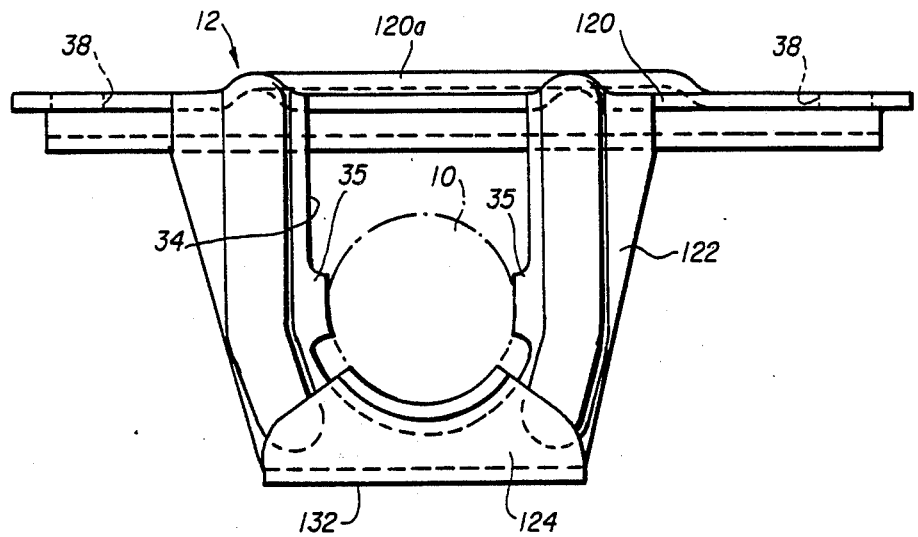
Figure 3:
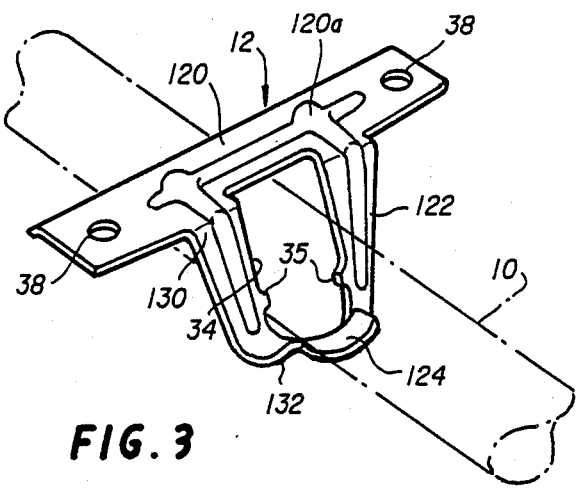

FIGS. 1 to 3 show a detailed structure of the column support bracket, in which FIG. 1 is a side view; FIG. 2 is an elevational view; and FIG. 3 is a perspective view. The column support bracket 12 comprises a mount portion 120, a retainer portion 122 and a support portion 124, which are integrally formed with each other by press working for example. The column support bracket 12 is formed of plastically deformable materials such as a hot-rolled sheet steel. A thickness of the column support bracket 12 is preferably about 3.6 mm in the case that the hot-rolled sheet steel is used. As an experimental result, an energy corresponding to a load of about 400 kg could be absorbed by using the hot-rolled sheet steel having such a thickness.

As shown in FIG. 3, the mount portion 120 with rib 120a is formed in an elongated substantially planar shape, and is provided with bolt holes 38 at both end portions thereof. As shown in FIG. 1, bolts 18 are inserted into the bolt holes 38 to fix the mount portion 120 to the support member 14. A fastening position of the bolts 18 is a position where the column support bracket 12 is mounted to the support member 14.

As shown in FIG. 1, the retainer portion 122 is extended from a first bent portion 130 to a steering wheel 16 side (not shown) mounted at a right end of the steering column tube 10. A bent angle $\theta_1$ of the retainer portion 122 is preferably less than 30 degrees, and is set to be preferably ½ of an angle $\theta_3$ of the retainer portion 122 generated by movement of the steering column tube 10 upon absorption of energy. Accordingly, an angle formed by the mount portion 120 and the retainer portion 122 ranges from 90 to 120 degrees.

As shown in FIGS. 2 and 3, the retainer portion 122 is provided with a retainer hole 34 through which the steering column tube 10 is inserted. The steering column tube 10 is held by both projections 35 of the retainer portion 122 so as to be relatively movable.

Referring back to FIG. 1, the support portion 124 is extended from a second bent portion 132 to the steering wheel 16 side. A bent angle $\theta_2$ of the support portion 124 is preferably greater than $\theta_1$ and substantially equal to $\theta_3$. The steering column tube 10 is fixed by welding 45 to the support portion 124 at an end 124a thereof.

Under such condition that the steering column tube 10 is inserted into the retainer hole 34 of the retainer portion 122, the first bent portion 130 formed at the upper end of the retainer portion 122 and the second bent portion 132 formed at the lower end of the retainer portion 122 are positioned on the upper and lower sides of the steering column tube 10, respectively. When the steering column tube 10 is axially moved by receiving impact energy, the first bent portion 130 and the second bent portion 132 are plastically deformed to absorb the impact energy.

There will now be described an energy absorbing operation. As shown in FIG. 1, the steering column tube 10 receives external forces in the directions as depicted by arrows A, B and C. The external force in the direction A is applied from an upper side with respect to an axis X of the steering column tube 10. The external force in the direction B is applied in the same direction as the axis X. The external force in the direction C is applied from a lower side with respect to the axis X.

Figure 4:
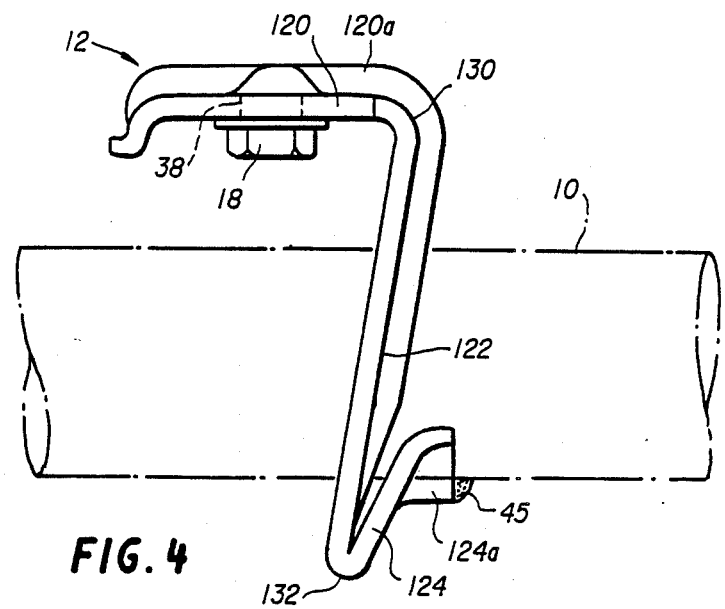

In the case that the external force is applied in the direction B, the first bent portion 130 is first plastically deformed, and then in association with the deformation of the first bent portion 130, the second bent portion 132 is plastically deformed. As a result, the column support bracket 12 is deformed as shown in FIG. 4.

In the case that the external force is applied in the direction A, a compression load is applied to the second bent portion 132, and accordingly the second bent portion 132 is hard to be deformed at the initial stage. Namely, the first bent portion 130 is first plastically deformed, and then in association with the deformation of the first bent portion 130, the second bent portion 132 is also plastically deformed. As a result, the column support bracket 12 is deformed as shown in FIG. 4.

Finally, in the case that the external force is applied in the direction C, a compression load is applied to the first bent portion 130, and accordingly the first bent portion 130 is hard to be deformed at the initial stage. Namely, the second bent portion 132 is first plastically deformed, and then in association with the deformation of the second bent portion 132, the first bent portion 130 is also plastically deformed. As a result, the column support bracket 12 is deformed as shown in FIG. 4.

As is described above, the first bent portion 130 and the second bent portion 132 are reliably plastically deformed in association with each other against the external forces in all of the directions, thereby effecting the energy absorbing action as desired.

In progressing of plastic deformation of the first bent portion 130 and the second bent portion 132 as shown in FIG. 1, the end 124a of the support portion 124 fixed to the steering column tube 10 by welding 45 is moved substantially linearly. That is to say, the end 124a is moved in accordance with an arcuate motion about the first bent portion 130 and an arcuate motion about the second bent portion 132. Since both the arcuate motions have reversed directions, loci of the arcuate motions are cancelled each other to some extent while they are carried out together, and accordingly a substantially linear motion is carried out. According to an experiment, such an operation has been well effected when $\theta 1$ is not more than 30 degrees and $\theta 2$ is greater than $\theta 1$.

In this manner, the linear motion of the steering column tube 10 in an energy absorbing operation brings an advantage that other devices provided adjacent to the steering column tube 10 are less influenced. If the steering column tube 10 is vertically largely vibrated in the energy absorbing operation, the other devices are required to be mounted without the range of such vibration, and as a result, a mount space of the other devices is limited.

Further, since the welding 45 to the end 124a of the support portion 124 and the steering column tube 10 is positioned on the steering wheel side from which an external force is applied, the welding 45 receives a compression load when the external force is applied to the steering column tube 10, and therefore there is no possibility that the welding 45 is peeled off. That is, if the welding receives a tensile load, there is a possibility of the welding being peeled off. However, according to the invention, such a problem is not generated.

As is described above, according to the invention, there are provided the first bent portion and the second bent portion for absorbing an impact energy by plastic deformation at upper and lower positions of the steering column tube. With this arrangement, the first and second bent portions are plastically deformed in association with each other against external forces at any angles from the steering wheel side to the steering column tube, thus effecting good energy absorbing operation against the external forces at any angles.

Further, since the mount portion of the column support bracket is not formed in such a conventional shape as to surround the steering column tube, but formed in a substantially planar shape, the mount portion is simplified in its shape, and the column support bracket may be easily manufactured as a whole.

(Second Preferred Embodiment)

FIGS. 6 to 10 show a second preferred embodiment of a support structure of a steering column tube according to the present invention.

Figure 10:
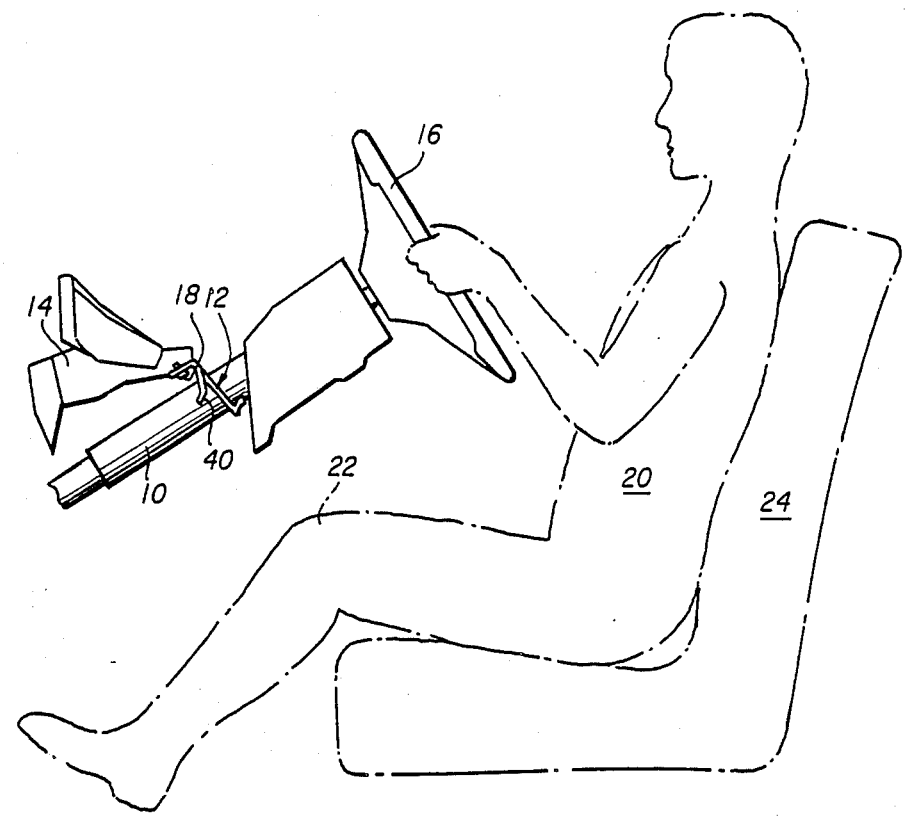

Referring to FIG. 10 which shows arrangement of the steering column tube, reference numerals 10, 12, 14 and 16 designate a steering column tube, a column support bracket, a support member such as an instrument panel and a steering wheel, respectively. The steering column tube 10 is retained by the column support bracket 12, and is supported to the support member 14 by bolts 18. The steering wheel 16 is provided at an upper end (at a right end as viewed in FIG. 10) of the steering column tube 10. The bolts 18 for fixing the column support bracket 12 to the support member 14 are located at a position opposed to a knee 22 of a driver 20. Reference numeral 24 designates a seat for the driver 20.

Figure 6:
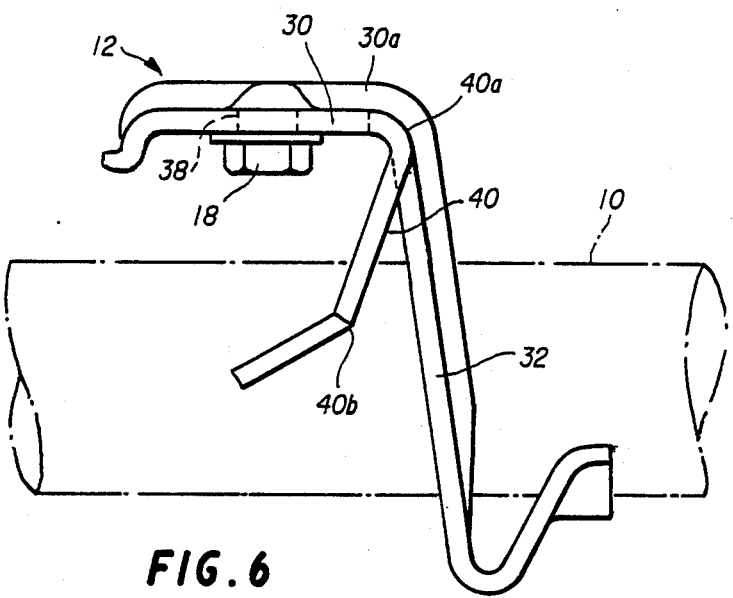
Figure 7:
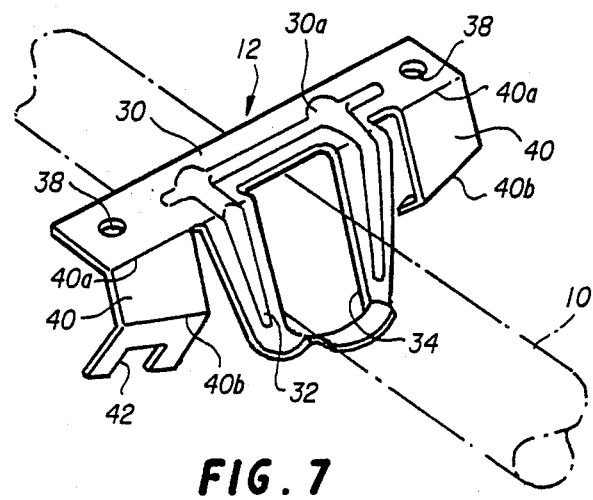
Figure 8:
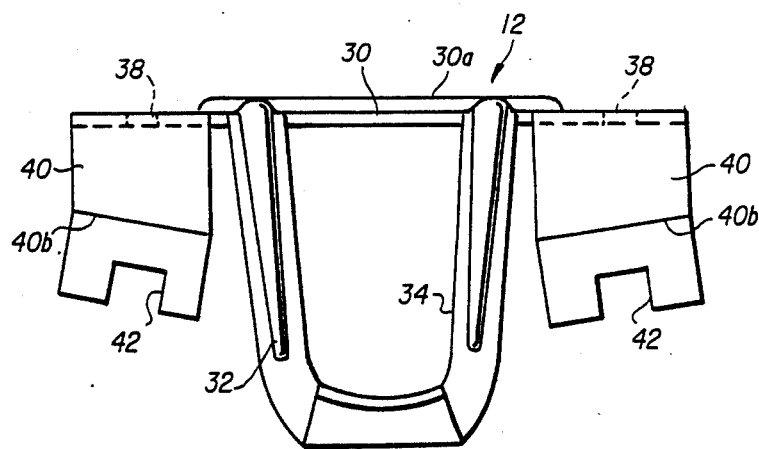

FIGS. 6 to 8 show a detailed structure of the column support bracket 12, in which FIG. 6 is a side view; FIG. 7 is a perspective view; and FIG. 8 is an elevational view. As shown in FIG. 7, the column support bracket 12 comprises a mount portion 30 with a rib portion 30a, a retainer portion 32 and protectors 40. The retainer portion 32 is formed at a central part of the column support bracket 12, and the protectors 40 are formed on both sides of the retainer portion 32. The retainer portion 32 and the protectors 40 are connected by the mount portion 30. All of the mount portion 30, the retainer portion 32 and the protectors 40 are integrally formed with each other by press working. The column support bracket 12 is formed of a plastically deformable sheet steel.

The mount portion 30 is formed in an elongated substantially planar shape, and is formed with bolt holes 38 at both end portions thereof through which the bolts 18 are inserted. Accordingly, mount positions of the bolts 18 are on both sides of an insertion position of the steering column tube 10. As shown in FIG. 6, the retainer portion 32 is bent to extend downwardly from the mount portion 30. As shown in FIGS. 7 and 8, the retainer portion 32 is formed with a retainer hole 34 through which the steering column tube 10 is inserted and retained by the column support bracket 12. The retainer portion 32 is integrally fixed to the steering column tube 10 by a suitable fixing means such as welding.

As shown in FIG. 6, the protectors 40 are also bent to extend downwardly from the mount portion 30 to a position under the bolts 18 in such a manner that a bent angle of the protectors 40 is greater than that of the retainer portion 32. Thus, the protectors 40 are located between the mount position of the bolts 18 and the knee 22 of the driver 20 (See FIG. 10).

As shown in FIGS. 6 and 7, the protectors 40 are formed with first bent portions 40a and second bent portions 40b. The first bent portions 40a form connecting portions between the mount portion 30 and the protectors 40. The second bent portions 40b are formed at an intermediate position of the protectors 40. As shown in FIG. 8, the second bent portions 40b are outwardly upwardly inclined, so that when the knee 22 of the driver 20 comes into abutment against the protectors 40, the knee 22 is allowed to slide away from the steering column tube 10.

As shown in FIGS. 7 and 8, the protectors 40 are formed at free ends thereof with recesses 42 for permitting insertion of a tool for fastening the bolts 18.

Figure 9:
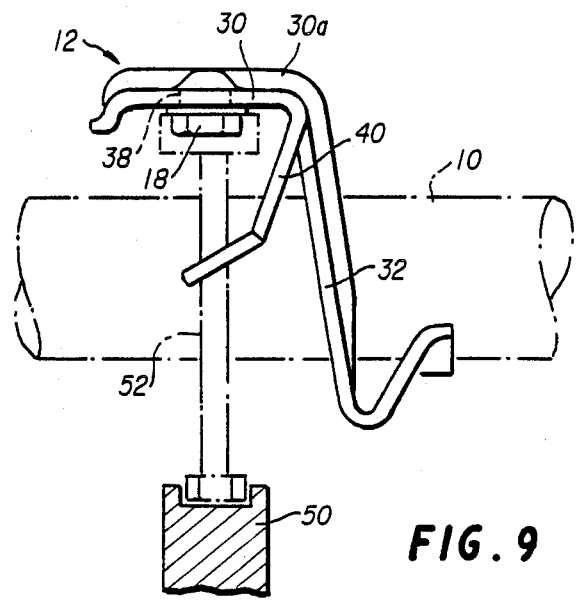

Referring to FIG. 9 which shows installation of the bolts 18, a rotary fastening tool 50 is arranged at a lower position of the bolts 18. A connecting tool 52 having a size coincident with that of the bolts 18 is fitted to the fastening tool 50, and the bolts 18 are fastened by rotating the fastening tool 50. In such installation, the connecting tool 52 does not interfere with the protectors 40 because the former is inserted through the recesses 42 of the latter.

According to the second preferred embodiment as mentioned above, since the protectors 40 are located between the mount position of the bolts 18 and the position of the knee 22 of the driver 20, the knee 22 does not come into direct abutment against the bolts 18 even when the driver 20 moves his foot so as to operate a pedal or the like. That is to say, the knee 22 comes into abutment against the protectors 40 before coming into abutment against the bolts 18. Even if the knee 22 comes into abutment against the protectors 40, the driver does not feel uncomfortable because the protectors 40 have no projections extending therefrom.

Further, since the protectors 40 are integrally formed with the mount portion 30 of the column support bracket 12, they can be mounted by fixing the mount portion 30 by means of the bolts 18. Namely, it is not necessary to independently mount the protectors in the conventional manner.

In the event that a large external force is applied to the protectors 40 when the knee 22 of the driver 20 were brought into abutment against the protectors 40 strongly, the protectors 40 are bent to be plastically deformed at the first bent portion 40a and the second bent portion 40b thereby to absorb an impact energy.

Especially, when the knee 22 comes into abutment against the protectors 40, the knee 22 slides away from the steering column tube 10 because the second bent portion 40b is outwardly and upwardly inclined, and accordingly the external force is weakened thereby to more effectively attain an energy absorbing function.

Figure 11:
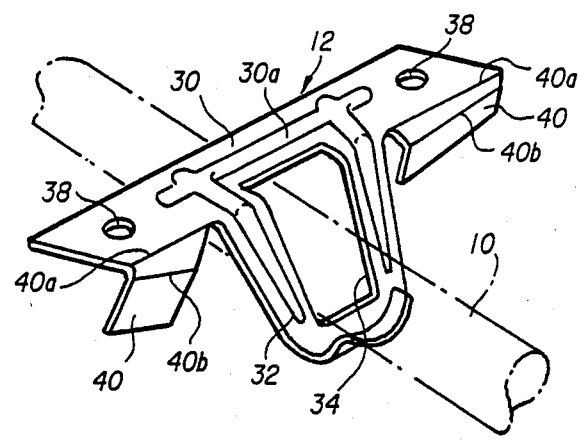

FIG. 11 shows a third preferred embodiment of the present invention, that is, a modification of the column support bracket 12, in which the same or similar parts as in the second preferred embodiment are designated by the same reference numerals.

In the third preferred embodiment, the protectors 40 have no recesses 42 which are provided in the second preferred embodiment. Therefore, the protectors 40 in the third preferred embodiment are bent to such an extent that the connecting tool 52 or the fastening tool 50 may be inserted so as to fasten the bolts 18. If necessary, the protectors 40 may be further bent after the bolts 18 are fastened. As the constitution of the third preferred embodiment is fundamentally the same as that of the second preferred embodiment, operation of the third preferred embodiment is similar to that of the second preferred embodiment.

While specific embodiments as shown in the drawings have been described, it should be appreciated that the invention is not to be limited to the specific embodiments, but can be modified within the scope of the invention.

For instance, while the second and third preferred embodiments disclose the protectors 40 having the second bent portion 40b which is outwardly and upwardly inclined, the second bent portion 40b may not be inclined. Additionally, the second bent portion 40b may not be provided.

As described above, according to the present invention, since the protectors act to hinder the knee coming into direct abutment against the bolts, it is possible to eliminate an uncomfortable feeling due to abutment of the knee against the bolts.

Further, since the protectors are integrally formed with the column support bracket, and accordingly they may be mounted by installation of the column support bracket, it is not necessary to independently mount the protectors, thereby simplifying installation of the protectors, and reducing the number of parts so as to render handling of the parts easy upon installation.

Furthermore, since the protectors are designed to be plastically deformed to absorb an impact energy upon receiving of an external force, the impact energy may be effectively absorbed even when a large external force is applied to the steering column tube.

I claim:
1. A support structure of an energy absorbing type steering column tube, (10) for being mounted to a support member (14) of a vehicle comprising:
 a column support bracket (12) mounted to said support members (14) for supporting said steering column tube, said steering column tube (10) having a steering wheel (16) at one end thereof, said column support bracket (12) being made of plastically deformable materials and having a substantially planar mount portion (120) adapted to be fixed to said support member (14), a retainer portion (122) extending toward said steering wheel and having a retainer hole (34) through which said steering column tube (10) is inserted, and a support portion (124) extending toward said steering wheel and fixedly mounted to said steering column tube (10), a first bent portion (130) formed at a juncture between said mount portion (120) and said retainer portion (122) and a second bent portion (132) formed at a juncture between said retainer portion (122) and said support portion (124), said steering column tube (10) being fixed to an end of said support portion (124) by a fixing means, wherein when an external force is axially applied to said steering column tube (10), said first bent portion (130) and said second bent portion (132) are plastically deformed so as to absorb impact energy of said external force.

2. The support structure of the energy absorbing type steering column tube as defined in claim 1, wherein said support portion (124) is formed with a pair of projections (35) projecting into said retainer (34) for slidably holding said steering column tube (10).

3. The support structure of the energy absorbing type steering column tube as defined in claim 1, wherein an angle formed by said mount portion (120) and said retainer portion (122) ranges from 90 to 120 degrees.

4. The support structure of the energy absorbing type steering column tube as defined in claim 3, wherein an angle $\theta 1$ obtained by subtracting 90 degrees from said angle between said mount portion (120) and said retainer portion (122) is substantially half an angle range $\theta 3$ where said retainer portion (122) is allowed to be bent relative to said mount portion (120).

5. The support structure of the energy absorbing type steering column tube as defined in claim 3, wherein an angle $\theta 2$ formed by said retainer portion (12) and said support portion (124) is substantially equal to said angle range $\theta 3$.

6. A support structure of a steering column tube for a vehicle including a column support bracket (12) for retaining a steering column tube (10), bolts (18) for mounting said column support bracket (12) to a support member (14) of said vehicle, said bolts (18) being located on both sides of said steering column tube (10) in opposed relation with a knee (22) of a driver (20), comprising a pair of protectors (40) formed as a single member with said column support bracket (12), said protectors (40) being provided between a mount position of said bolts (18) and a position of said knee (22), and being bent so as to allow plastic deformation.

7. The support structure of the energy absorbing type steering column tube as defined in claim 6, wherein said column support bracket comprises a mount portion (30), a retainer portion (32) for retaining said steering column tube (10) and a pair of protectors (40), said protectors (40) being bent at a pair of first bent portions (40a) formed at junctures between said mount portion (30) and said protectors (40).

8. The support structure of the energy absorbing type steering column tube as defined in claim 7, wherein each of said protectors (40) is bent, at a second bent portion (40b) formed at an intermediate position of each protector (40).

9. The support structure of the energy absorbing type steering column tube as defined in claim 7, wherein said protectors (40) are bent to extend to a position not over said extension of said bolts (18).

10. A support structure of a steering column tube for a vehicle including a column support bracket (12) for retaining a steering column tube (10), bolts (18) for mounting said column support bracket (12) to a support member (14) of said vehicle, said bolts (18) being located on both sides of said steering column tube (10) in opposed relation with a knee (22) of a driver (20), comprising a pair of protectors (40) formed as a single member with said column support bracket (12), said protectors (40) being provided between a mount position of said bolts (18) and a position of said knee (22), and being bent so as to allow plastic deformation, wherein said column support bracket comprises a mount portion (30), a retainer portion (32) for retaining said steering column tube (10) and a pair of protectors (40), said protectors (40) being bent at a pair of first bent portions (40a) formed at junctures between said mount portions (30) and said protectors (40) and wherein each of said protectors (40) is bent at a second bent portion (40b) formed at an intermediate position of each protector (40) and wherein second bent portions (40b) extends from an inside edge of said protector (40b) to an outside edge thereof in such a manner as to approach said first bent portion (40a).

11. A support structure of a steering column tube for a vehicle including a column support bracket (12) for retaining a steering column tube (10), bolts (18) for mounting said column support bracket (12) to a support member (14) of said vehicle, said bolts (18) being located on both sides of said steering column tube (10) in opposed relation with a knee (22) of a driver (20), comprising a pair of protectors (40) formed as a single member with said column support bracket (12), said protectors (40) being provided between a mount position of said bolts (18) and a position of said knee (22), and being bent so as to allow plastic deformation, wherein said column support bracket comprises a mount portion (30), a retainer portion (32) for retaining said steering column tube (10), and wherein said protectors (40) are bent to extend to a position over an extension from said bolts (18), and said protectors (40) are formed on said extension with recesses (42) through which a tool (50), (52) is allowed to be inserted.

* * * * *